United States Patent [19]

Owen

[11] Patent Number: 4,625,497

[45] Date of Patent: Dec. 2, 1986

[54] METHOD AND APPARATUS FOR EXTRACTING THE CONTENTS OF ENVELOPES

[75] Inventor: Trevor W. Owen, Mississauga, Canada

[73] Assignee: Owen Tri-Cut Limited, Mississauga, Canada

[21] Appl. No.: 777,069

[22] Filed: Sep. 17, 1985

[51] Int. Cl.[4] .............................................. B65B 69/00
[52] U.S. Cl. .................................. 53/492; 53/381 R; 53/392; 414/405
[58] Field of Search .................. 414/405, 412; 53/492, 53/383, 381 R, 392, 390

[56] References Cited

U.S. PATENT DOCUMENTS

| | | | |
|---|---|---|---|
| 3,193,082 | 7/1965 | Crane | 53/392 X |
| 3,884,010 | 5/1975 | Bardo et al. | 414/412 X |
| 3,934,733 | 1/1976 | Worden | 414/405 |
| 4,356,679 | 11/1982 | Ellis et al. | 414/412 X |
| 4,571,140 | 2/1986 | Yamada et al. | 414/412 |

Primary Examiner—James F. Coan
Attorney, Agent, or Firm—Rogers, Bereskin & Parr

[57] ABSTRACT

Batches of envelopes that have previously been opened along one edge are simultaneously emptied of their contents by securing the envelopes to a support by their edges opposite to the open edges, using a pressure-sensitive adhesive, and vibrating the support to dislodge the contents. A tray positioned below the envelopes is progressively lowered so that the contents are laid into the tray in an orderly fashion, and in sequence.

15 Claims, 19 Drawing Figures

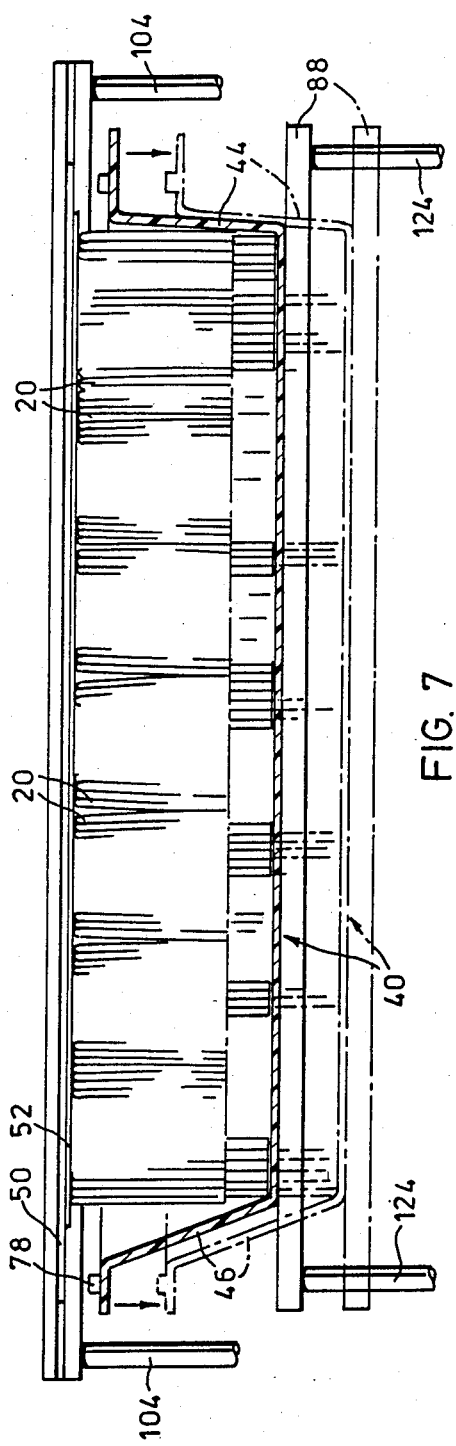
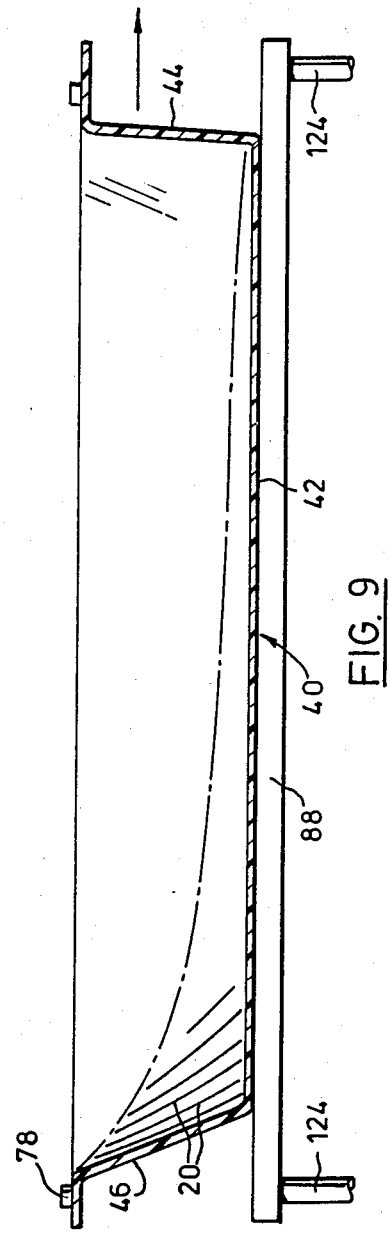

METHOD AND APPARATUS FOR EXTRACTING THE CONTENTS OF ENVELOPES

BACKGROUND OF THE INVENTION

1. Field of the Invention

This invention relates generally to mail processing equipment and is concerned more particularly with a method and apparatus for extracting the contents of envelopes.

Opening of envelopes and extraction and handling of their contents represents a significant labour cost for credit card companies, utilities and other organizations that receive large volumes of mail. For example, a credit card company or the like may receive tens of thousands of envelopes each day. Evenly envelope must be opened and its contents must be extracted, checked, sorted and processed. Many of the envelopes will contain an invoice or remittance advice and cheque for the amount of the invoice. However, in other cases, one or other of these items will be missing or there will be a discrepancy between the invoice amount and the cheque while in other cases correspondence will be included.

An analysis by the Bank Administration Institute in 1968 identified eight different categories into which incoming mail would be sorted in a typical remittance processing operation. That study showed that the average processing time for each piece of mail was 9.98 seconds after the envelope had been opened and that 5.88 seconds of this time was required to obtain the envelope and remove its contents. This corresponds to processing of only 361 items per hour for each operator.

2. Description of the Prior Art

Automatic equipment is available for opening envelopes. For example, U.S. Pat. Nos. 3,301,116 and 3,952,874 both issued to Trevor W. Owen disclose mail processing equipment for this purpose. Equipment manufactured under U.S. Pat. No. 3,301,116 is commercially available under the trade mark TRI-CUT from Bell & Howell Inc. of Chicago, Ill. The TRI-CUT 3-WAY LETTEROPENER opens each envelope along the bottom longitudinal edge and each end edge. Opened envelopes are delivered to an operator in batches from the TRI-CUT 3-WAY LETTEROPENER but the operator must still separate the contents from the front and rear sheets that made up the envelope.

In a remittance processing operation, the contents of the envelope will typically comprise two relatively thin sheets, namely a cheque and a remittance advice or invoice as discussed previously. In practice, there is a natural tendency for these items to cling to the front and read sheets that made up the envelope and in some cases the remittance advice and cheque may even be trapped in the unopened edge that was at the top of the envelope. These factors make it awkward for the operator to remove the contents from the envelope and to some extent account for the large amount of the overall processing time that is occupied by removal of the contents of the envelope. It is also at least partly because of these difficulties that contents extraction from envelopes is generally performed by hand.

An object of the present invention is to provide a method of extracting the contents of envelopes which can be operated on a batch system to simultaneously extract the contents of a relatively large number of envelopes as an aid to speeding mail processing. Another object is to provide an apparatus for use in performing the method.

SUMMARY OF THE INVENTION

The method of the invention requires that each envelope shall have been opened along at least one longitudinal edge and shall have an unopened opposite longitudinal edge. A support is provided having a generally planar surface carrying an adhesive and a batch of envelopes is arranged on the support with the envelopes generally parallel to one another and their unopened longitudinal edges in contact with the adhesive. The adhesive is capable of adhering the envelopes to the support by their unopened longitudinal edges. With the envelopes adhered to the support in this way, the support is oriented so that the envelopes are suspended from the support above a tray for receiving the contents of the envelope. The support is then vibrated to dislodge the contents from the envelopes and permit them to fall into the tray.

As will be described in more detail below, the envelopes are preferably flared prior to being adhered to the support to cause separation of the unopened longitudinal edges of the envelopes by compressing the envelopes in the batch along marginal portions adjacent their opened longitudinal edges. This ensures that the envleopes are not too tightly packed together since this would tend to cause the contents of the envelopes to be trapped and would inhibit removal of the contents. While it would be possible to appropriately space the envelopes other than by flaring, this latter technique has been found to provide a reliable method of achieving the required spacing in a high volume processing environment.

Multiple batches of envelopes may be adhered to the same support by using a holder to temporarily retain the batches of envelopes. As will be described, the holder can be designed to provide for flaring of the envelopes.

The tray that receives the contents of the envelopes when the support is vibrated is preferably initially positioned with its bottom wall close to the openend edges of the envelopes and is progressively moved away from the support as the contents move out of the envelopes. Thus, it has been found that the vibratory action referred to above causes the contents of the envelopes to progressively migrate downwardly away from the support while the envelopes remain attached to the support and that if the tray moves in corresponding fashion at the same speed, the contents of the envelopes are deposited into the tray standing on their lower edges in an orderly sequence corresponding to the sequence of the envelopes on the support. Preferably, the tray has an end wall which slopes outwardly away from the bottom wall of the tray so that the contents of the envelopes tend to fall in orderly fashion towards that end wall when the tray is pulled forward sharply, generally similarly to the manner in which a deck of cards can be laid in sequence onto a table.

The invention also provides an apparatus for extracting the contents of envelopes which have been preopened as discussed previously. The apparatus includes a temporary envelope holder adapted to receive at least one batch of envelopes with the envelopes generally parallel to one another and the unopened longitudinal edges of the envelopes exposed at the same side of the holder. A support having a generally planar surface is provided for contact with the said unopened longitudinal edges of the envelopes while the envelopes are in the holder. The support carries an adhesive capable of securing the envelopes to the support. The apparatus also includes means for vibrating the support with the envelopes suspended therefrom, and means for supporting a tray below the support for receiving the contents of the envelopes dislodged by the said vibration.

Preferably, the support takes the form of a plate to which a disposable self-adhesive sheet is secured so that, when the contents have been extracted from all of the envelopes, the sheet can be peeled off the support, together with the attached envelopes and either discarded immediately or temporarily retained in case it should become necessary to identify a particular item of mail with the envelope from which it came.

A further aspect of the invention resides in the provision of a disposable self-adhesive sheet for use in this way, comprising a base layer coated on both sides with a pressure-sensitive adhesive and respective outer release layers covering the adhesive and adapted to be peeled off the base layer to expose the adhesive when the sheet is to be used. The adhesive is weaker on one side of the base layer than the other so that the weaker adhesive can be used to adhere the sheet to the support while permitting easy removal later, and the stronger adhesive can be used to adhere the envelopes to the base layer.

BRIEF DESRIPTION OF THE DRAWINGS

In order that the invention may be more clearly understood, reference will now be made to the accompanying drawings which illustrate a preferred embodiment of the invention by way of example, and in which:

FIGS. 1a–1e comprise five diagrammatic illustrations illustrating the method of the invention in schematic form;

FIG. 7 shows the tray being progressively withdrawn downwardly away from the support during vibration thereof;

FIG. 9 is a vertical sectional view showing the tray of FIGS. 6 and 7 with the contents of the envelopes deposited therein;

DESCRIPTION OF THE PREFERRED EMBODIMENT

Figure 1A:
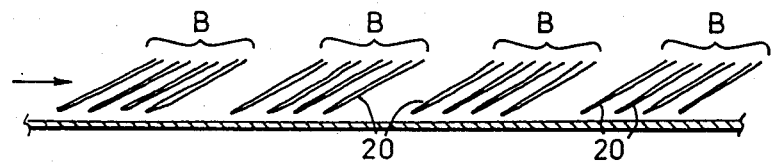
Figure 2:
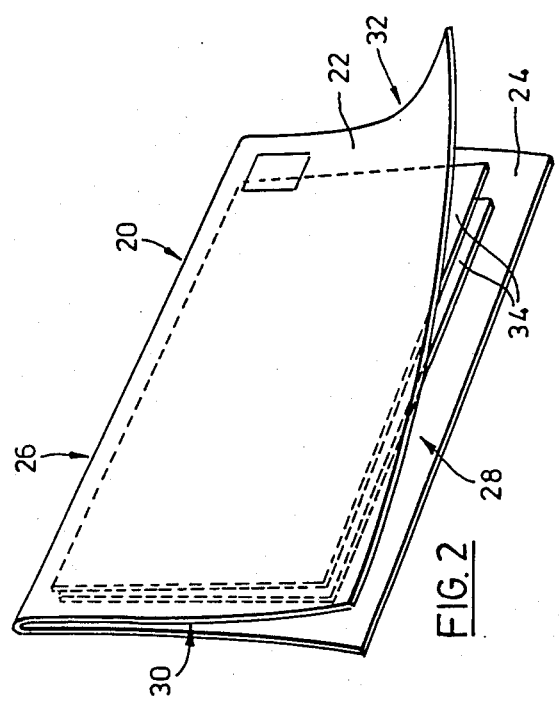
FIG. 2 is a perspective view of an envelope which has been pre-opened prior to extraction of its contents by the method of the invention.

Referring to the drawings, FIG. 1(a) illustrates diagrammatically batches of envelopes being delivered to an operator from a TRI-CUT 3-WAY LETTEROPENER. The batches are denoted B and the individual envelopes are indicated by reference numeral 20. For the purposes of illustration, each batch is shown to comprise only a small number of envelopes, but in practice, each batch will in fact comprise a much larger determined number of envelopes, typically 45 or 50. The TRI-CUT 3-WAY LETTEROPENER is capable of delivering envelopes in numbered batches of this order with each envelope having been opened along one longitudinal edge and both side edges. FIG. 2 shows a typical such envelope as comprising front and rear sheets 22 and 24 joined at an unopened longitudinal edge 26. The opposite, opened longitudinal edge is denoted 28 and the open side edges are denoted 20 and 32. Within the envelope are two items of mail collectively denoted 34 and typically comprising a remittance advice or invoice and a cheque.

Figure 1B:
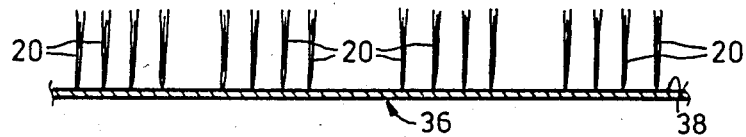

FIG. 1(b) shows the individual batches B of envelopes arranged on a support 36 having a generally planar surface 38 carrying an adhesive. The envelopes in each batch are arranged generally parallel to one another with their unopened longitudinal edges adhered to the support by the adhesive. Again, for the purposes of illustration, the envelopes are shown relatively widely spaced and with the individual batches spaced from one another.

Figure 1C:
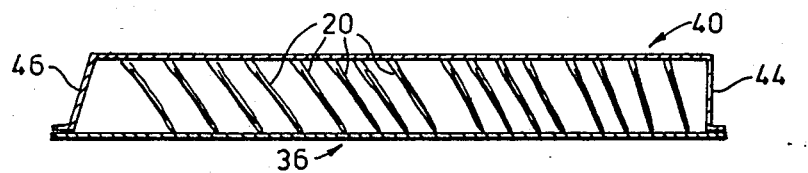
Figure 1D:
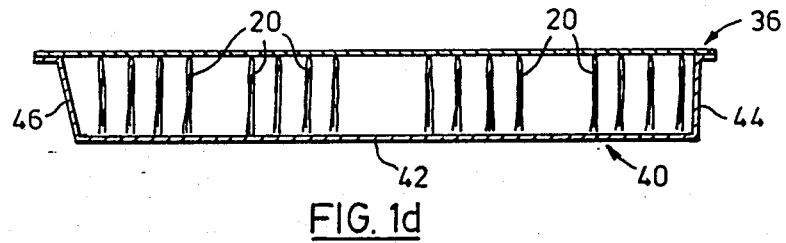
Figure 1E:
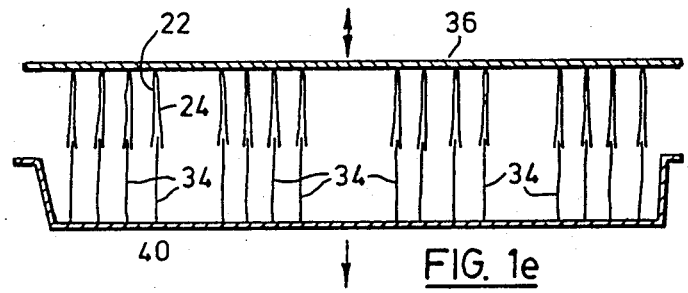

In order to remove the contents from the envelopes, a tray 40 having a bottom wall 42, one upright end wall 44 and one outwardly inclined end wall 46 is placed over the support 36 (to which the envelopes are affixed by their closed edges) as shown in FIG. 1(c) and both are inverted to the position shown in FIG. 1(d). As shown in FIG. 1(e), the support 36 is then vibrated while tray 40 is moved progressively downwardly at a speed related to the speed at which the contents of the envelopes are caused to migrate downwardly by the vibrations imparted to support 36. When vibration stops, the contents of the envelopes (e.g. remittance advices and cheques) remain standing upright, supported by a ⅛" engagement of the remittance advice in the bottom of each envelope, with only a few of the contents at the sloped end of the tray inclined. A sharp tug on the tray handle will cause all contents to fall in orderly fashion into the tray and tend to fall in the manner of a deck of cards towards the outwardly inclined end wall 46 as best illustrated in Fig. (9). The tray can then be taken by the operator and the contents of the envelopes removed directly from the tray in sequence and processed as required. As will be described, the envelopes can be temporarily retained in case it becomes necessary to identify the envelope from which a particular item of mail came; however, ultimately, the envelopes will be discarded. Identification of a particular envelope if necessary can easily be accomplished because of the fact that the contents are deposited in the tray in orderly fashion and in a sequence corresponding to the sequence of the envelopes on a support. The majority of the envelopes carry return addresses, making possible identification of a particular envelope.

Having described the method of the invention in principle with particular reference to FIGS. 1 and 2 of the drawings, reference will now be made to the remaining views in describing a practical embodiment of the invention.

Figure 3:
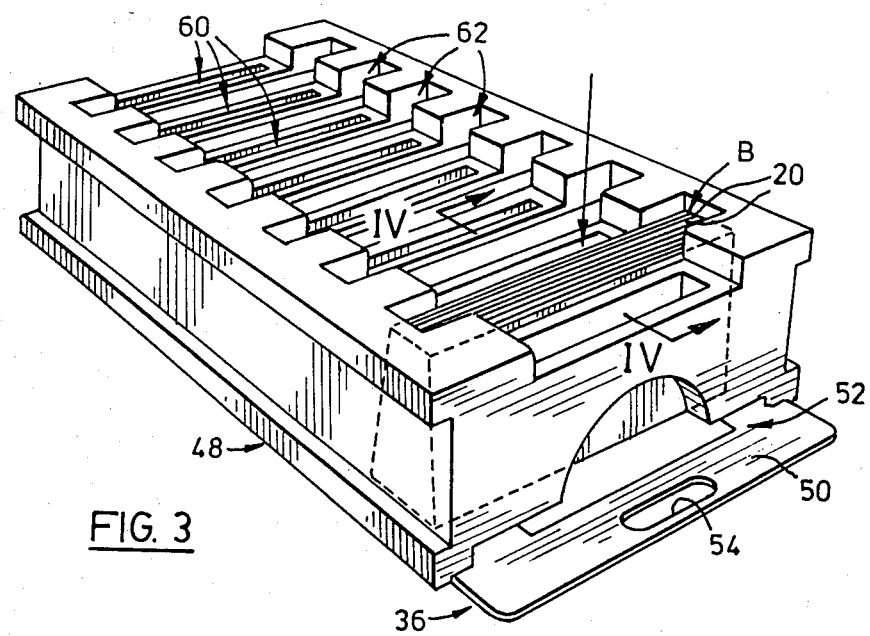
FIG. 3 is a perspective view of an envelope holder for use in the method of the invention.
Figure 4:
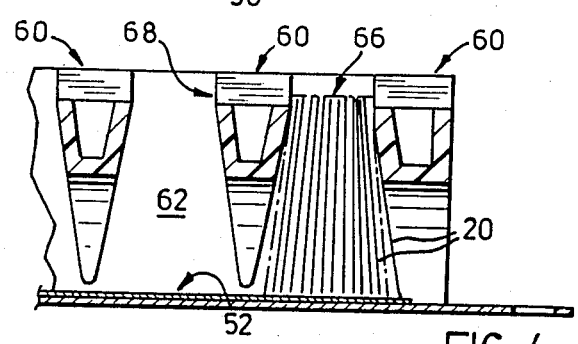
FIG. 4 is a vertical sectional view on line IV—IV of FIG. 3.
Figure 5:
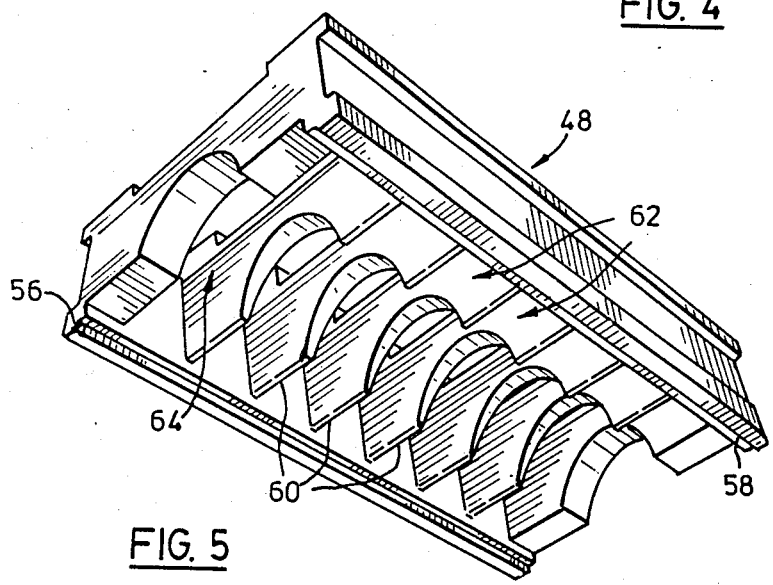
FIG. 5 is an underneath perspective view of the holder of FIG. 3.
Figure 11:
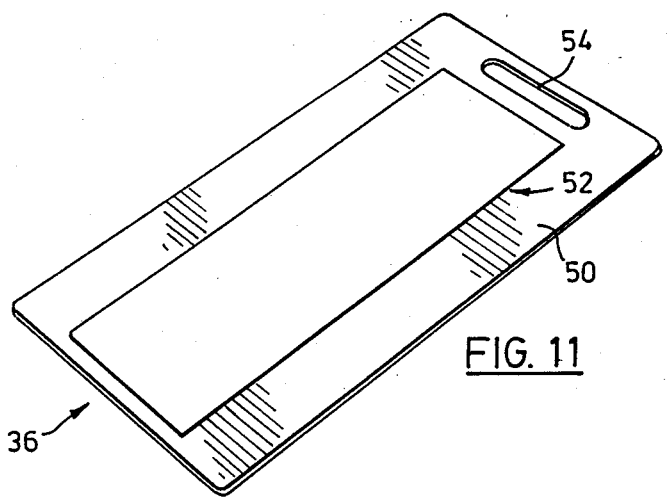
FIG. 11 is a perspective view from above showing the support for the envelopes, prior to adhesion of the envelopes to the support.

FIGS. 3, 4 and 5 illustrate an envelope holder 48 in which the batches of envelopes received from the TRI-CUT 3-WAY LETTEROPENER (FIG. 1(a)) are inserted and temporarily retained during adhesion of the envelopes to the support referred to above. In FIG. 3, a support is generally indicated at 36 below holder 48 and takes the form of a flat rectangular plate or board 50, the upper surface of which carries a disposable self-adhesive sheet 52 which presents an exposed adhesive surface for contact by the envelopes to be adhered to support 36. FIG. 11 shows plate 50 separate from holder 48 and carrying sheet 52. The sheet itself is shown separately in FIG. 12. For present purposes, it is sufficient to note that plate 50 is of rectangular shape with rounded corners and has an opening 54 for facilitating manipulation of the plate.

FIG. 5 shows the envelope holder 48 from below as compared with FIG. 3 and it will be seen from FIG. 5 that a pair of straight parallel rebates 56, 58 are provided for receiving plate 50 and locating the plate laterally with respect to the holder. FIG. 5 also illustrates the fact that a series of partitions 60 divide the holder into compartments 62, each for receiving a batch of envelopes. One such batch of envelopes is in fact shown in position in the compartment 62 that appears at the righthand end of the holder 48 in FIG. 3.

In practice, holder 48 is inverted as compared with the position in which it is shown in FIG. 3 and batches of envelopes are loaded into each of the compartments 62 in turn. As discussed previously, the envelopes are delivered from the TRI-CUT 3-WAY LETTEROPENER in batches of 45 or 50 envelopes. The oprerator takes each batch in turn by hand and inserts that batch into one of the compartments 62. The envelopes in each batch are all similarly oriented and each batch is inserted into the holder 48 with the opened longitudinal edges 28 (FIG. 2) of the envelopes down. Arrow 64 in FIG. 5 illustrates the direction of insertion of one such batch and as discussed, the envelopes will enter the compartment with their opened longitudinal edges leading.

Prior to inserting each batch into the holder, the operator preferably strikes the envelopes onto a hard surface with their opened longitudinal edges 28 down so that the contents of the envelopes tend to be jogged towards those open edges.

In summary, each batch of envelopes is taken from the TRI-CUT 3-WAY LETTEROPENER, struck on a hard surface and then inserted into one of the compartments 62 with the holder 48 inverted as compared with FIG. 5. When all of the compartments 62 have been filled, plate 50 is then placed over the exposed unopened edges of the envelopes with its edges received in the rebates 56 and 58, its ends extending equidistant over holder 48, and its adhesive sheet 52 facing the envelopes. While holding the plate 50 in contact with and centered on the holder 48, the holder is then inverted to the position shown in FIG. 3 and placed on a support surface.

FIG. 4 shows the cross-sectional shapes of some of the partitions 60 between the compartments 62 of holder 48. It will be seen that the partitions 60 are of downwardly tapering shape considering the holder in the orientation shown in FIG. 3. In other words, the partitions taper towards the support plate 50 or in the direction of the unopened longitudinal edges of the envelopes. The shapes of the partitions 60 and their spacing are selected so that a typical batch of 45 of 50 envelopes is compressed at the opened edges 28 of the envelopes as indicated by reference umeral 66 in FIG. 4 so that the envelopes tend to fan apart towards their unopened edges 26 as shown in that view. It will of course be appreciated that this flaring will take place as each batch of envelopes is inserted into the holder and before the support plate 50 is in place. Consequently, when the support plate is brought into contact with the envelopes, the envelopes will have been spaced apart at their unopened longitudinal edges and will adhere to the support plate in this configuration. When the support is subsequently separated from the holder 48, the envelopes will be freed to move apart at their opened edges, which will ensure that the envelopes are not overly tightly packed together.

In practice, it has been found that the sides of the partitions 60 should be straight and parallel in the regions denoted 68 in FIG. 4 at the top of the holder as seen in FIG. 3 so that the partitions will in effect grip approximately the top one quarter inch of the batches of envelopes.

In any event, each of the compartments 62 is loaded with a batch of envelopes with the envelope holder inverted as compared with FIGS. 3 and 4 and the envelopes in each batch will be automatically "flared" as they are inserted into the compartment. Plate 50 will then be placed over the unopened longitudinal edges of the envelopes and the holder/plate combination will then be inverted to the position shown in FIG. 3. At that time, all of the compartments 62 will contain batches of envelopes. The next step is to then firmly tap down the envelopes in each of the compartments (as indicated by arrow A in FIG. 3) to ensure that they become securely attached to the adhesive sheet 52.

Details of sheet 52 will be described in more detail later. For present purposes, it is sufficient to note that the adhesive on the outer surface of sheet 52 is a contact adhesive selected to provide for substantially instaneous adhesion of the envelopes to the sheet. While fairly rapid adhesion is to be preferred, in principle, there is no limitation in this respect and it would in fact be possible to use adhesives that require a curing time although it would then be necessary to make special arrangements in the work flow to the operators by preparing sufficient supports in advance. It would also be possible to provide adhesive on plate 50 other than in the form of a completely covered adhesive sheet. For example, strips of adhesive could be used, possibly in the form of double-sided tapes applied to plate 50, or beads of hot melt glue on throw-away cardboard supports.

Figure 6:
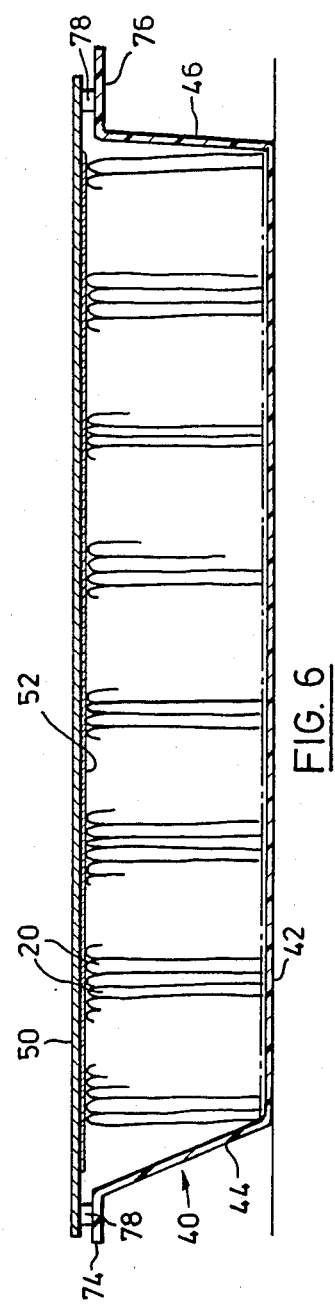
FIG. 6 is a vertical sectional view showing batches of envelopes suspended from a support and disposed in a tray prior to vibration of the support for extraction of the contents of the envelope.
Figure 10:
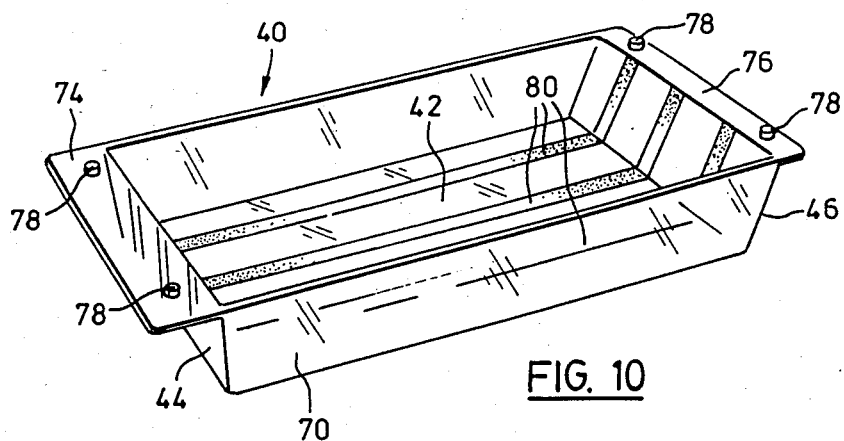
FIG. 10 is a perspective view from above of the tray shown in FIGS. 6, 7 and 9.

In any event, assuming that the batches of envelopes in compartment 62 have all been satisfactorily adhered to plate 50, the next step is to remove the envelope holder 48. Holder 48 is then ready for loading with the next batches of envelopes. Next, a tray 40 is placed over a plate 50 as discussed previously in connection with FIG. 1, and both are inverted so that the envelopes are suspended within the tray as shown in FIG. 6. FIG. 10 shows the tray in perspective and it will be seen that the tray is a moulding in a transparent or translucent plastic material and has a flat bottom wall 42, an upright end wall 44 and an outwardly sloping end wall 46 as discussed previously. The tray also has side walls 70 which are upright. A continuous flange or lip projects outwardly from the top edge of each of the end walls 44 and 46 and defines surfaces 74 and 76 at the ends of the tray which carry stops 78 on which the support plate 50 rests at this stage in the extraction procedure.

Referring back to FIG. 10, it will be seen that strips 80 of a friction-engendering material such as emery paper extend in spaced positions longitudinally of the top surface of the bottom wall 42 of tray 40. These strips are provided to inhibit slippage of the envelope contents with respect to the tray during the final stages of the extraction operation (to be described). In an alternative embodiment, the strips 80 may be moulded integrally with the remainder of the tray. Corresponding low-friction strips (not shown) may be provided along the outer surface of the bottom wall 42 and end walls 44 and 46 of the tray for facilitating insertion of the tray and its removal from its vibrating equipment shown in FIG. 13.

The next step in the extraction procedure following inverting of support plate 50 and tray 40 is to insert the tray and plate into the apparatus of FIG. 13 as will be described. At this time, the relative positions of the plate and tray will be generally as shown in full lines in FIG. 7; that is, with the plate supported at a slight spacing above and clear of the tray. The plate 50 is then vibrated generally vertically, which causes the contents of the envelopes to migrate progressively downwardly out of the envelopes. At the same time, the tray 40 is progressively lowered generally at the same rate as the rate of movement of the envelope contents so that those contents are deposited uniformly and in orderly fashion into the tray. Upon completion of the downward movement of the platform 88 the contents are standing upright in tray 40 supported by a ⅛" engagement with the bottom open edge of the envelopes. At the outwardly inclined end wall 46 of tray 40 some contents will fall against this inclined wall. All other contents resting in the tray 40 will remain vertical until the tray 40 is given a sharp pull forward approximately 1" away from a backstop (not shown). As a result all contents will fall freely back towards the inclined wall 46 of tray 40 generally in the manner of a deck of cards and adopt a final configuration having generally the profile shown in FIG. 9. The tray can then be removed from the apparatus for processing of the removed contents in sequence.

Figure 8:
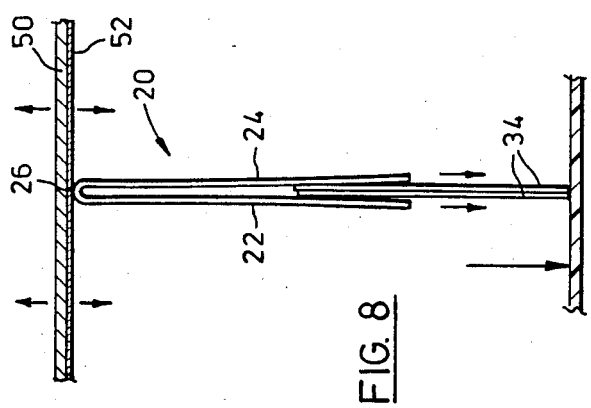
FIG. 8 is a somewhat diagrammatic vertical sectional view through one of the envelopes appearing in FIG. 7, showing the contents leaving the envelope.

FIG. 8 shows somewhat schemmatically one of the envelopes 20 and its contents 34 leaving the envelope in response to vibration of plate 50 and under the control of progressive downward movement of tray 40.

Figure 12:
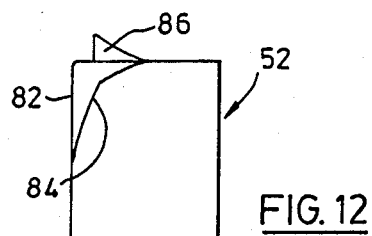
FIG. 12 is a perspective view showing a disposable self-adhesive sheet for use on the support.

FIG. 11 shows the support 36 provided by plate 50 and the sheet 52 adhered thereto. FIG. 12 shows the sheet by itself. Plate 50 is a plain, thin member and is made of plastic, although metal or other suitable material may be used. Sheet 52 is secured to plate 50 by pressure-sensitive adhesive and is disposable. In this embodiment, the sheet 52 is a die-cut laminate approximately six inches wide by sixteen inches long and comprises a base layer 82 coated on both sides with a pressure-sensitive adhesive and respective outer release layers 84 and 86 covering the adhesive and adapted to be peeled off the base layer as shown in FIG. 12 to expose the adhesive when the sheet is to be used. In other words, the sheets 52 will be supplied to the operator of the apparatus as disposable items, successive ones of which can be successively stuck onto and subsequently removed from the same plate 50. The adhesive on the respective sides of the base layer 82 is weaker on one side of the base layer than on the other so that the weaker adhesive can be used to adhere the sheet to the plate 50 while the stronger adhesive can be used to adhere the envelopes to the sheet. This will ensure that the sheet will peel off the plate 50 in preference to the envelopes becoming detached from the sheet. Once the contents have been removed from the envelopes, the sheet, together with the attached envelopes, can be readily peeled off the plate 50 and either temporarily retained in case it should become ecessary to identify a particular envelope as discussed previously, or discarded. Plate 50 is then ready for re-use with a fresh sheet 52.

In this particular embodiment, the base layer 82 of sheet 52 and the release layers 84 and 86 are paper and the release layers are silicone coated. Commercially available pressure-sensitive adhesives were used on base layer 82. Suitable sheets 52 are available from Kleen Stik Fasson of Toronto, Canada.

Figure 13:
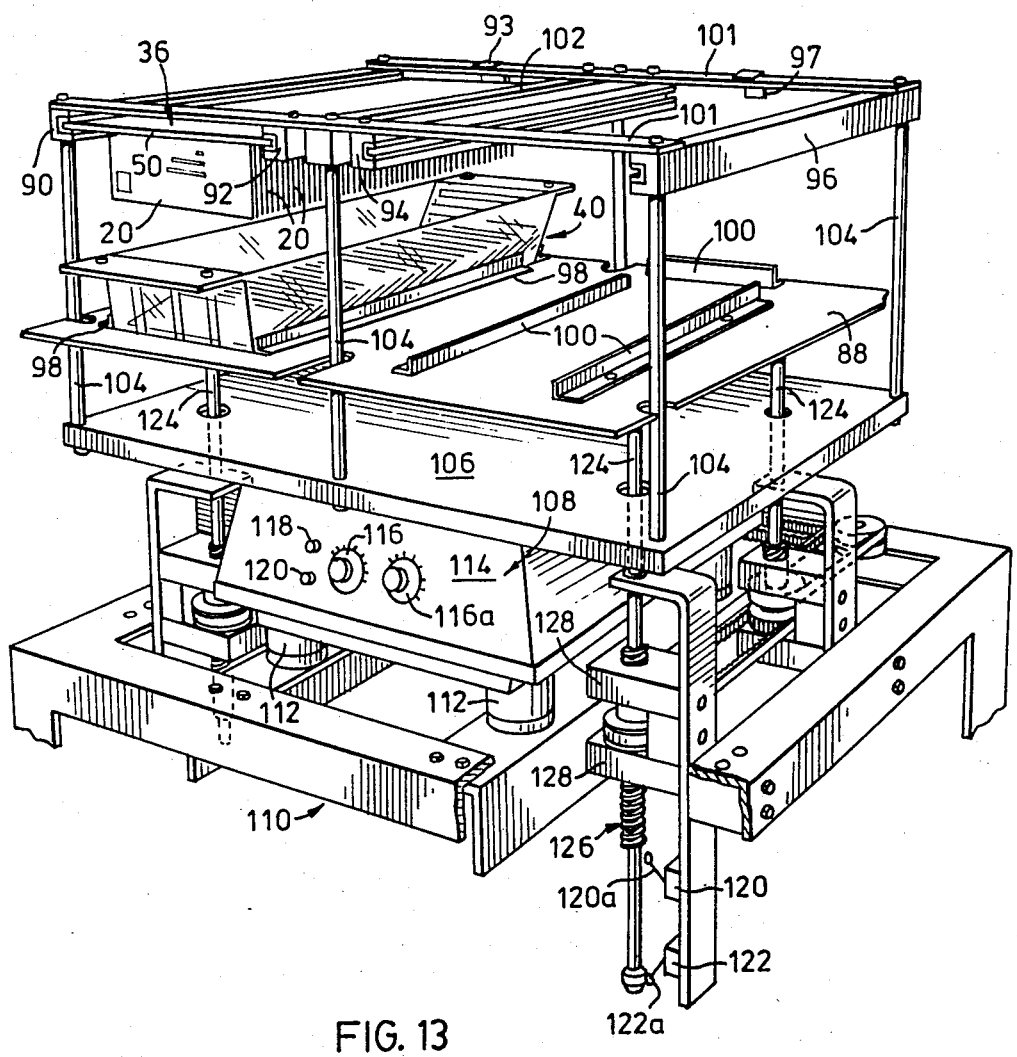
FIG. 13 is a perspective view of vibrating equipment forming part of the apparatus of the invention.
Figure 14:
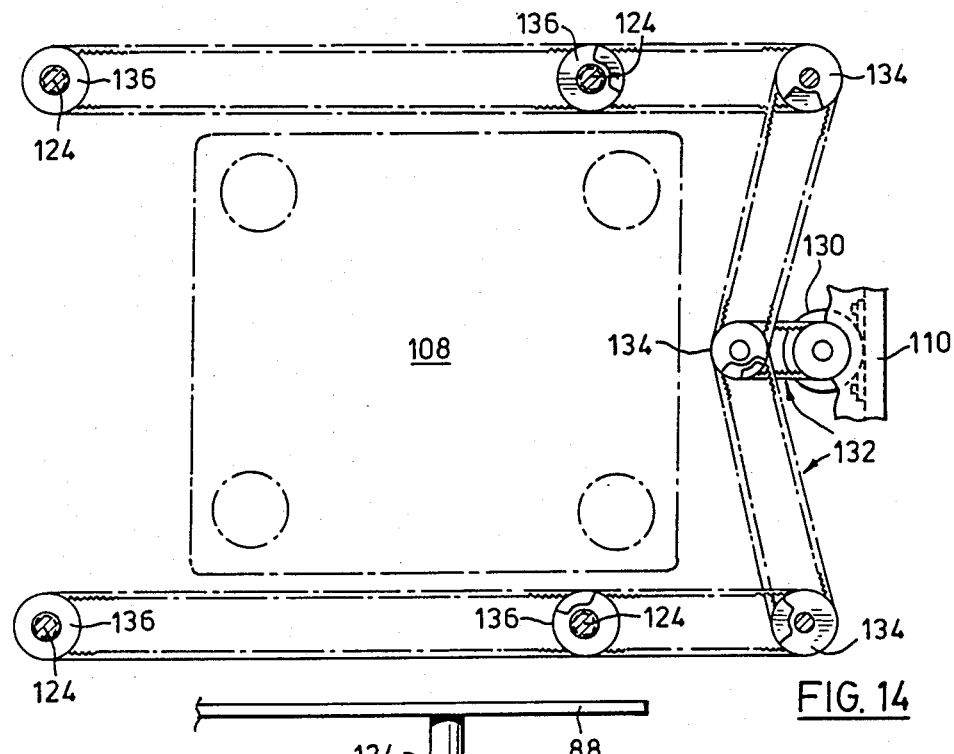
FIG. 14 is a schematic plan view showing part of the drive arrangement of the apparatus of FIG. 13; and, FIG. 15 is an elevational view showing a part of that drive arrangement.
Figure 15:
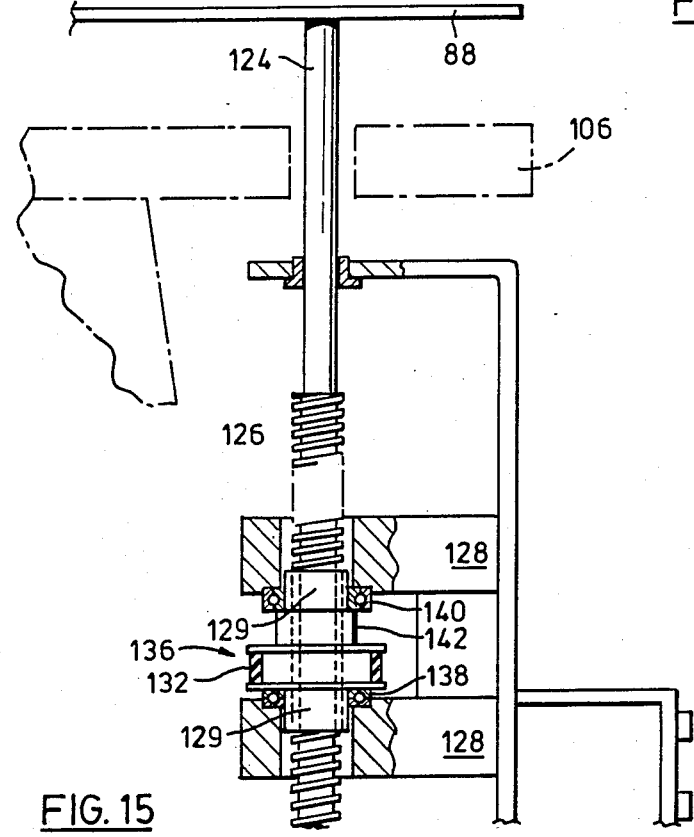

Reference will now be made to FIGS. 13 to 15 in describing the equipment used to vibrate the support plate 50 and attached envelopes while withdrawing the receiving tray from below the envelopes. In FIG. 13, the tray 40 is shown supported on a non-vibratory plate or platform 88 below an array of envelopes 20 suspended from plate 50. The spacing between the envelopes and the tray has been exaggerated somewhat for the purposes of illustration and does not represent the normal spacing at the beginning of the extraction operation (see FIG. 7).

The longitudinal side margins of plate 50 are received in respective horizontal guides 90 and 92 arranged so that the plate can be slide longitudinally into the guides to a backstop 93. A second, similar pair of guides 94, 96 are provided adjacent and parallel to the guides 90 and 92 along with a backstop 97 so that a second plate (not shown) can also be accommodated at the same time if required. Tray 40 is also positioned between two side guides, and a backstop, so that the contents of the envelopes are free to fall without contacting the side wall 70 or the end walls 44 and 46 of tray 40. In FIG. 13, the guides and backstop for tray 40 are shown as angle section members 98 bolted to platform 88. A second similar set of members 100 is provided below guides 94, 96. The bolts securing members 98 and 100 pass through slots (not shown) in platform 88 arranged to permit the positions of the members to be adjusted after ntus (not shown) on the bolts below platform 88 have been loosened.

The guides 90, 92, 94 and 96, together with cross pieces 101 and a member 102 parallel to the guides form a frame which is carried at the top of six vertical columns 104 extending upwardly from a deck 106 below and parallel to platform 88. Deck 106 is in turn supported by a commercially available vibrator 108 on a main frame 110 of the equipment. In this embodiment, the vibrator is known as a model J-50-B JOGGER available from FMC Corporation. The unit has feet 112 which are coupled to the frame 110 and includes the deck 106. When the unit is in operation, deck 106 vibrates generally vertically with respect to the remainder of the unit. A casing of the unit is denoted 114 and includes two rheostat controls 116, 116a, a fuse 118 and an on/off button 120.

In this embodiment, the vibrator is modified to provide for two different strengths of amplitudes of vibration at different times during the extraction cycle. It has been found that a higher strength vibration initially is useful in dislodging the contents from within the envelopes but at the same time is not required throughout the cycle and in fact may be detrimental in some cases in that it may tend to cause the contents to travel back up into the envelopes. For this reason, the equipment switches automatically to a second, lower strength vibration after the initial portion of the cycle. This is achieved by two microswitches 120 and 122 which are carried by frame 110 and which have respective operating levers 120a and 122a arranged to be operated in accordance with the vertical position of the platform 88 supporting tray 40 as will be described.

With continued reference to FIG. 13, it will be seen that platform 88 is supported by vertical shafts 124, three of which are visible in FIG. 13; FIG. 14 makes it clear that four shafts are provided. Each shaft is coupled at its upper end to the platform 88 by a simple collar (not shown) affixed to the underside of platform 88 and held in position by two set screws in the collar. Each shaft includes a screw-threaded portion 126 which passes through clearance openings in two spaced blocks 128 carried by frame 110. Collars 129 (FIG. 15) prevent the screw-threaded portions 126 contacting the blocks 128.

Referring to FIG. 14, it will be seen that a single drive motor 130 carried by frame 110 is coupled by a series of toothed belts 132 and pulleys 134 to pulleys 136 carried by the shafts 124. FIG. 15 shows a typical one of the pulleys 136 and is representative of all four pulleys. Pulley 136 has an internal screw-thread complementary to the external screw-thread 126 on the shaft 124. The pulley is located against movement axially of the shaft 124 by two bearings 138 and 140 at the inner sides of the blocks 128 and a sleeve 142 so that as the pulley 136 is turned by the belt 132 the shaft will be moved axially by virtue of the screw-threaded coupling between the pulley and the shaft. Similar pulley arrangements are provided for each of the shafts 124 so that all four shafts will move to the same extent in the same direction when motor 130 is operated.

Referring back to FIG. 13, the shaft 124 adjacent the microswitches 120 and 122 extends downwardly below its screw-threaded portion 126 and is fitted at its end with a cam 144 for operating the respective microswitches 120, 122. Thus, during the initial part of the operation, microswitch 120 will be operated by cam 144 causing the stronger amplitude vibration discussed previously. As the platform 88 descends, cam 144 will operate microswitch 122, switching to the lower amplitude vibration at the lower position of platform 88, In a production form of the equipment, a suitable housing or casing will be provided for the moving parts but the area surrounding platform 88 will probably be left unenclosed so that visual supervision of the extraction operation will be possible. On the othe hand, it is contemplated that manual intervention will not in fact be required other than in exceptonal situations where, for example, an unusually bulky envelope or other abnormal situation is encountered. A suitable timer will be provided to switch off the equipment after an oppropriate cycle time has expired and the tray 40, together with the extracted envelope contents will then be removed from platform 88 for subsequent processing. Plate 50 will be simply slid endways from the guides 90 and 92 and the envelopes and sheet 52 stripped from the plate permitting the plate to be reused.

It should of course be understood that the preceding description relates to a particular preferred embodiment of the invention only and that many modifications are possible within the broad scope of the invention. Some alternatives have been indicated previously and others will be apparent to a person skilled in the art. It will also be understood that the method of the invention may in fact be practised using apparatus other than that specifically described previously or other forms of apparatus.

I claim:

1. A method of extracting the contents of envelopes each of which has been opened along at least one longitudinal edge and has an opposite unopened longitudinal edge, the method comprising the steps of:
   providing a support having a generally planar surface carrying an adhesive;
   arranging a batch of said envelopes on said support with the envelopes generally parallel to one another and with their unopened longitudinal edges in contact with said adhesive, the adhesive being capable of causing the envelopes to adhere to the support by their said unopened longitudinal edges;
   orienting the support with the envelopes suspended from the support, above a tray for receiving the contents of the envelopes; and,
   vibrating the support to dislodge the contents from the envelopes and permit them to fall into the tray.

2. A method as claimed in claim 1, comprising the further step of flaring the envelopes to cause separation of said unopened longitudnal edges by compressing the envelopes in the batch along maraginal portions thereof adjacent said opened longitudinal edges prior to adhering the envelopes to said support, for ensuring separation of the envelopes along the support.

3. A method as claimed in claim 1, wherein a plurality of said batches of envelopes are arranged in a series along and secured to a single support.

4. A method as claimed in claim 3, further comprising the step of providing a temporary envelope holder defining a series of compartments each for receiving a said batch of envelopes, the holder being arranged to maintain the envelopes with their unopened longitudinal edges exposed and spaced for adhesion to said support.

5. A method as claimed in claim 1, comprising the further step of progressively withdrawing the tray downwardly away from said support at a rate related to the rate at which the contents of the envelopes descend so that said contents are deposited into the tray in an orderly, uniform fashion.

6. A method as claimed in claim 5, wherein said tray has a first, generally upright end wall disposed generally parallel to the envelopes and a second end wall at the opposite end of the tray which is inclined outwardly so that the contents of the envelopes are encouraged to fall in a series towards the sloping end wall in the manner of a deck of cards.

7. A method as claimed in claim 1, wherein said support comprises a plate having on its said upper surface a disposable self-adhesive sheet adhered to the plate by a pressure-sensitive adhesive and presenting an exposed surface carrying a pressure-sensitive adhesive suitable for adhering the envelopes to the sheet, the adhesive adhering the sheet to the plate being weaker than the adhesive adhering the envelopes to the sheet so that the sheet will tend to detach from the plate more readily than the envelopes will tend to detach from the sheet.

8. A method as claimed in claim 5, wherein said step of vibrating the support is performed at two different amplitudes of vibration comprising a first vibration stage of strong amplitude and a second vibration stage of weaker amplitude, said second stage commencing after the contents of the envelopes have begun to descend below the open lower edges of the envelopes.

9. A disposable self-adhesive sheet for attachment to a plate for providing a support to be used in the method of claim 1, the sheet comprising a base layer coated on both sides with a pressure-sensitive adhesive, and respective outer release layers covering said adhesive and adapted to be peeled off the base layer to expose the adhesive when the sheet is to be used, said adhesive being weaker on one side of the base layer than the other so that the weaker adhesive can be used to adhere the sheet to the support while the stronger adhesive can be used to adhere the envelopes to the sheet.

10. Apparatus for extracting the contents of envelopes, each of which has been openend along at least one longitudinal edge and has an opposite unopened longitudinal edge, the apparatus comprising:
   a temporary envelope holder adapted to receive at least one batch of said envelopes with the envelopes generally parallel to one another and the unopened longitudinal edges of the envelopes exposed at the same side of the holder;
   a support having a generally planar surface for contact with said unopened edges of the envelopes, said surface carrying an adhesive capable of causing adhesion of the envelopes to the support;
   means for vibrating the support with the envelopes suspended therefrom; and,
   means for supporting a tray below the support for receiving the contents of the envelopes dislodged by said vibration.

11. An apparatus as claimed in claim 10, wherein said temporary envelope holder defines a series of compartments, each for receiving a said batch of envelopes, the envelopes being arranged generally parallel to one another in all of said compartments with the unopened longitudinal edges of all of the envelopes exposed at the same side of the holder.

12. An apparatus as claimed in claim 11, wherein said compartments are defined by dividers, each of a shape which tapers towards said same side of the holder, the compartments being dimensioned so that a batch of envelopes in each compartment is compressed at the marginal edges of the envelopes adjacent said opened edges, causing the envelopes to fan outwardly towards said unopened edges for spacing the envelopes along said support.

13. An apparatus as claimed in claim 10, wherein said support comprises a plain plate and a diposable self-adhesive sheet adhered to said plate by a pressure-sensitive adhesive and presenting an exposed adhesive surface for adhering the envelopes to the sheet.

14. An apparatus as claimed in claim 10, wherein said means for vibrating the support and said means for supporting a tray are provided by equipment comprising a base frame supporting a vibration unit; means coupled to said vibration unit for removably retaining said support in an overhead position, and a platform disposed below said support retaining means and coupled to said frame for supporting a said tray independently of vibrations imparted to said support.

15. An apparatus as claimed in claim 14, wherein said support retaining means is coupled to the vibration unit by generally vertical columns extending through clearance openings in said platform, and wherein the equipment further comprises means for progressively raising and lowering the platform with respect to said frame so that a tray on said platform can be progressively lowered below a support in said retaining means so that the contents of envelopes carried by said support can be deposited in uniform, orderly fashion into said tray.

* * * * *